Dec. 25, 1923.
F. SCHAFER
1,478,532
APPARATUS FOR TESTING TIRES
Filed June 13, 1919    4 Sheets-Sheet 3
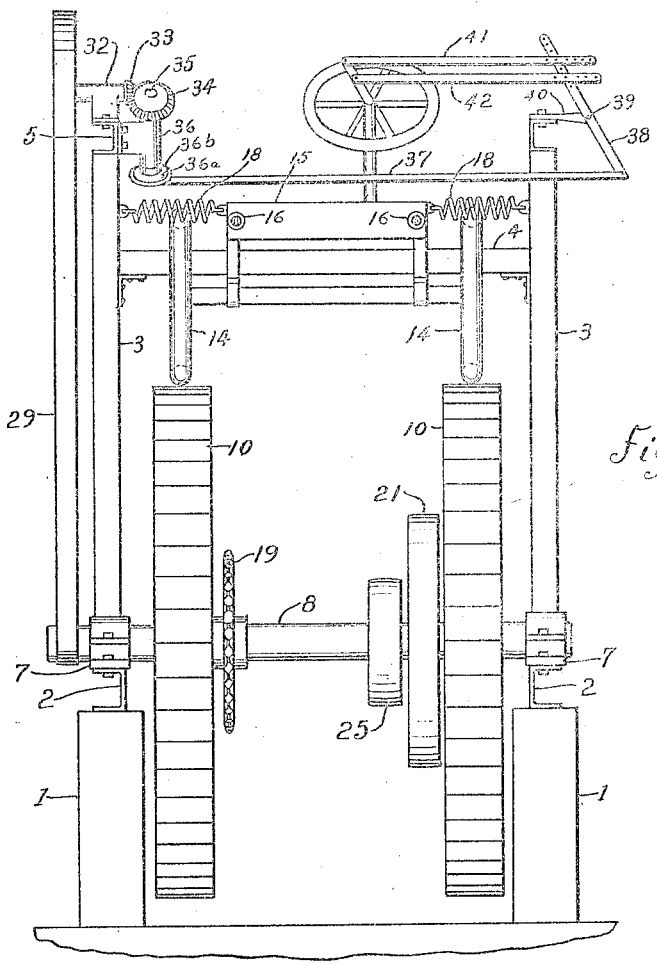
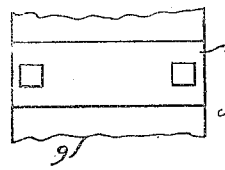
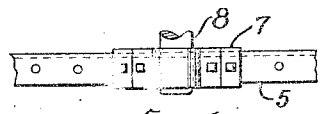
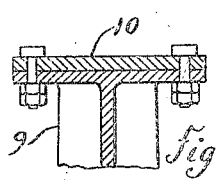
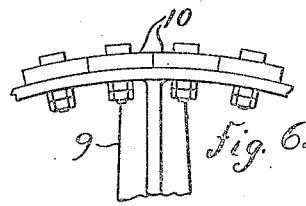
Frank Schafer
Inventor
By Attorneys Patented Dec. 25, 1923.

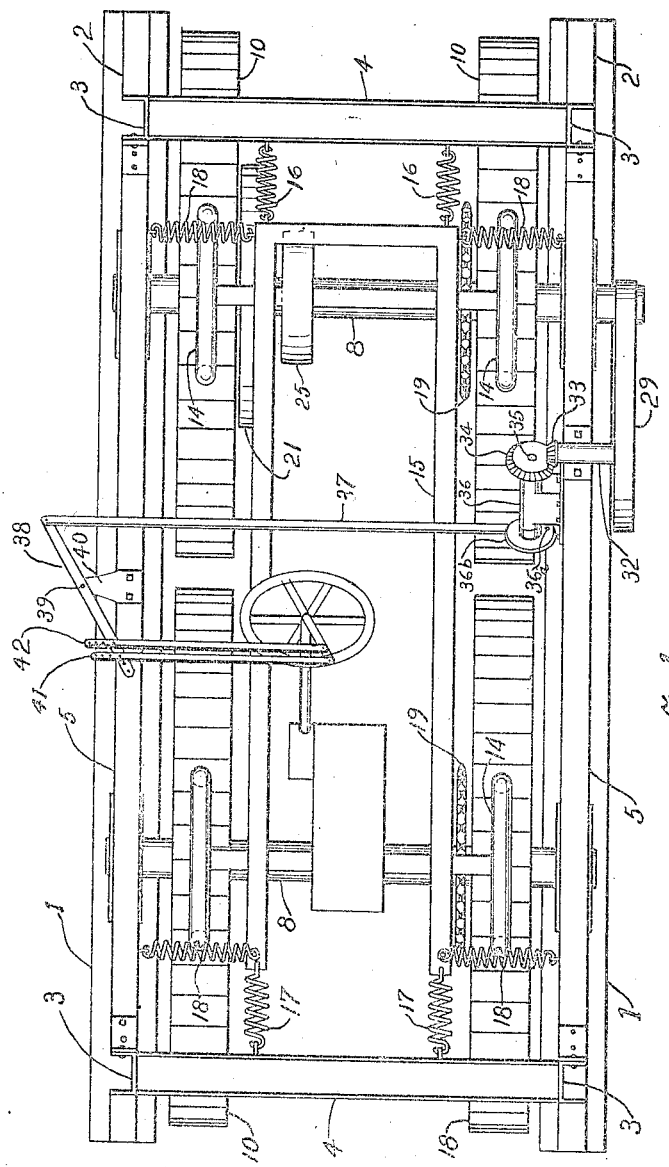

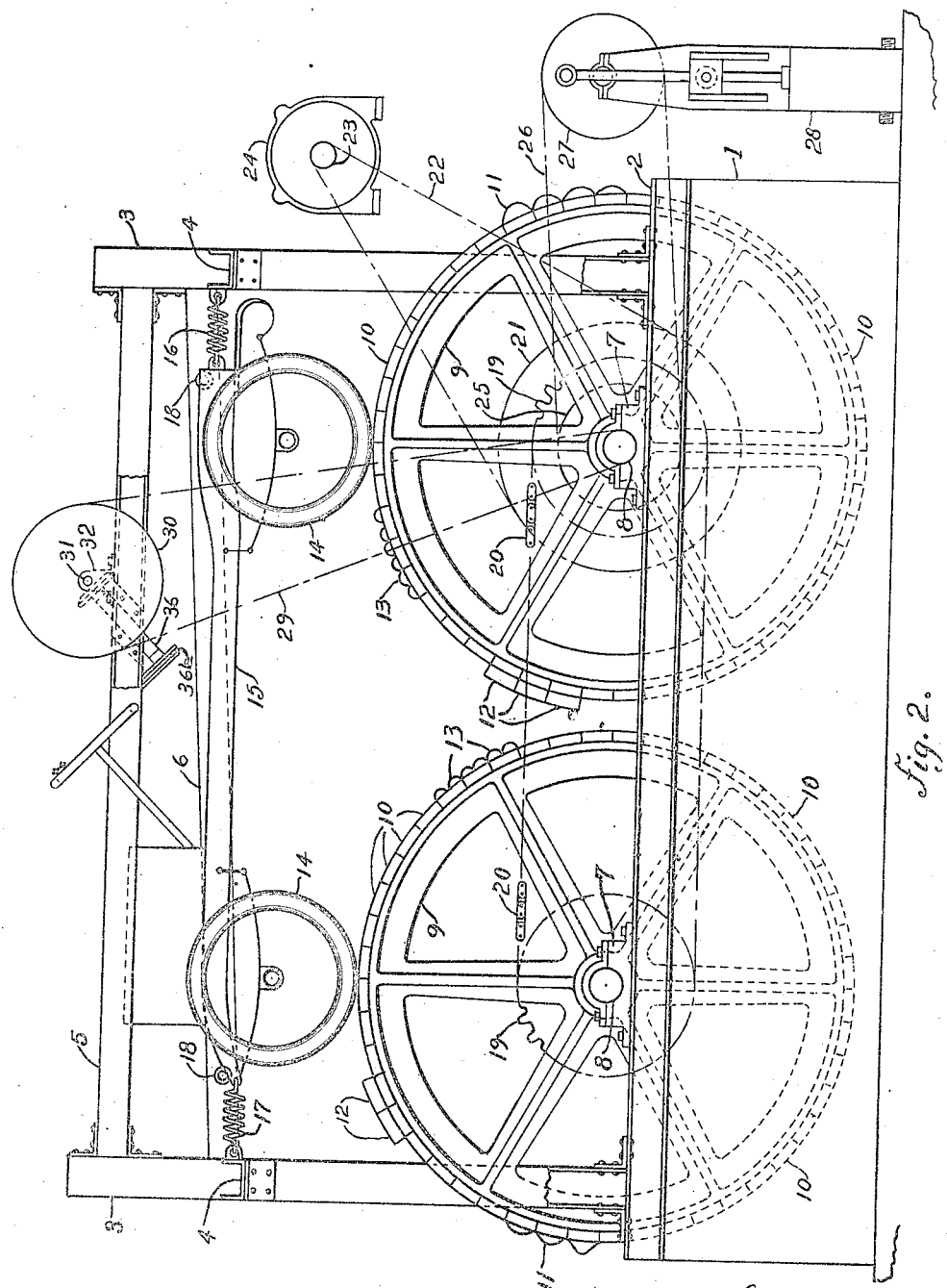

1,478,532

UNITED STATES PATENT OFFICE.

FRANK SCHAFER, OF BARBERTON, OHIO.

APPARATUS FOR TESTING TIRES.

Application filed June 13, 1919. Serial No. 304,071.

*To all whom it may concern:*

Be it known that I, FRANK SCHAFER, a citizen of the United States, residing at Barberton, in the county of Summit and State of Ohio, have invented certain Improvements in Apparatus for Testing Tires.

This invention relates to a method and apparatus for testing the strength and wearing qualities of tires; of reproducing as near as possible, actual road conditions, in which the tires are tested on the automobile itself under its own power plant; of means for varying or changing the road surface, reproducing either a smooth or rough roadway; of means for providing a braking resistance to the speed of the tires approximating road conditions, of means whereby this braking resistance is not dissipated in useless heat but into useful light, heat or power having an actual value; of adjustable means for varying the speed of rotation of the tires, and of other new and novel features as may be brought out in the following description.

Fig. 1 is a plan view of the apparatus showing an automobile chassis with its tires resting on the roadway wheels and flexibly held within a supporting frame.

Fig. 2 is a side elevation of Fig. 1 showing the tires resting on the roadway wheels and the braking resistance as applied by a dynamo or pump thus furnishing useful light, heat or power.

Fig. 3 is an end elevation of Fig. 1 showing the tires resting on the roadway wheels and means for varying the speed of the power plant of the chassis.

Fig. 4 is an enlarged plan view of a block of smooth roadway and a section of the roadway wheel.

Fig. 5 is a sectional view of Fig. 4 showing the bolts securing a block to the roadway wheel.

Fig. 6 is a side elevation of the roadway wheel showing a consecutive number of blocks secured thereto.

Fig. 6ª is a view showing holes in the supporting channels for the bolts to permit moving the bearings of the roadway wheels to accommodate automobiles of different wheel base.

Figure 7:
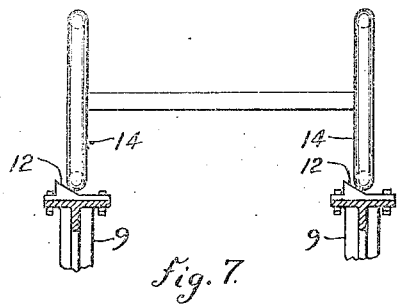

Fig. 7 is a view, partly sectional, showing a form of block which causes a side thrust upon a tire.

Figure 8:
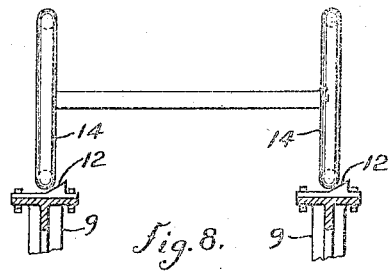

Fig. 8 is a view, partly sectional, similar to Fig. 7, showing a form of block causing a side thrust opposite to that of Fig. 7.

Figure 9:
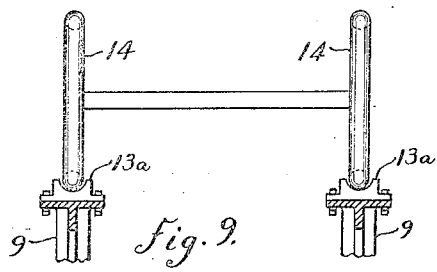

Fig. 9 is a view, partly sectional, showing a form of block approximating a road rut.

Figure 10:
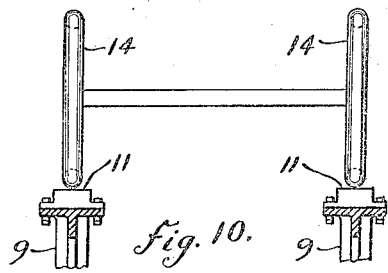

Fig. 10 is a view, partly sectional, showing a form of block approximating a rough road.

Figure 11:
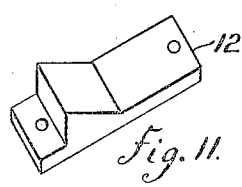

Fig. 11 is an isometric view of the block shown in Figs. 7 and 8.

Figure 12:
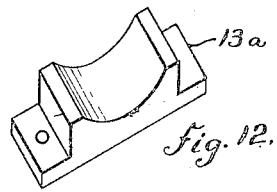

Fig. 12 is an isometric view of the block shown in Fig. 9.

Figure 13:
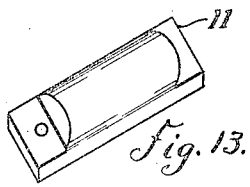

Fig. 13 is an isometric view of the block shown in Fig. 10.

Figure 14:
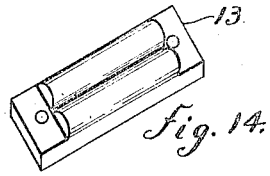

Fig. 14 is an isometric view of a modified form of rough road block.

Referring to the drawings, 1 designates a suitable foundation of any desired construction or material which supports the channels 2 to which are secured the uprights 3 to which are also secured the channels 4, 5 and 6; these channels and uprights are securely fastened together and make a frame work, the purpose of which will be disclosed hereinafter.

7 designates bearings secured to channels 2 in which rotate shafts 8 to which are secured the roadway wheels 9 and to the periphery of which is secured the blocks 10, 11, 12, 13, 13ª by suitable bolts, the latter forming the actual roadway upon which the tires 14 of the automobile run.

15 designates the frame of the automobile which is flexibly secured to the channels 4 and 6 by springs 16 at the rear end, 17 at the front end and 18 at the sides.

Also secured to the shafts 8 are sprockets 19 partly around which passes a chain 20 and which causes the roadway wheels 9 to rotate in unison.

Also secured to one of the shafts 8 is a pulley 21 partly around which passes a belt 22 which also passes partly around a pulley 23 of the dynamo 24 rotating the armature of the latter and thereby acting as a braking resistance to the roadway wheels 9.

Also secured to one of the shafts 8 is a pulley 25 partly around which passes a belt 26 which also passes partly around a pulley 27 of the pump 28 and thereby acting as a braking resistance to the roadway wheels 9 in a manner similar to the dynamo.

29 designates a belt which passes partly around one of the shafts 8 and also partly around pulley 30 secured to shaft 31 rotating in a bearing 32 secured to channel 5; also secured to shaft 31 is a bevel gear 33 meshing with bevel gear 34 secured to shaft 35 rotating in bearing 36 secured to channel 5; also secured to shaft 35 is a crank disk 36$^b$ having a crank pin 36$^a$ on which is pivoted a connecting rod 37 which is also pivoted to a lever 38, the latter pivoted at or near its center on pin 39 in bracket 40 secured to channel 5. The lever 38 has at one end a series of holes in which are pivoted bars 41 and 42 which are pivotally connected to the gas and spark segment of the steering wheel of the automobile so as to vary the position of these in a manner similar to manual control. The bars 41 and 42 also have a series of holes through which a suitable pin passes so as to vary the amount of gas and change the position of the spark as desired.

For clearness of illustration I have shown an automobile with its power plant, steering wheel and tires. In actual operation a complete automobile can be used and the passengers can be replaced by suitable weights; therefore in using the word automobile it is intended that it shall embody either or both of the above mechanisms.

The frame of the automobile is flexibly supported within the framework of the channels 3, 4, 5 and 6 by the springs 16, 17 and 18. As soon as the engine of the automobile is started it will rotate the tires 14 which by frictional contact on the blocks 10, 11, 12, 13 and 13$^a$ would cause the automobile to move to the left as seen in Figs. 1 and 2; this forward motion is resisted by the springs 16 which are hinged or secured to the frame of the automobile and also to the channel 4 thus holding th automobile approximately stationary as regards forward motion; as the roadway blocks 10, 11, 12, 13, 13$^a$ are of various shapes and heights they will upon rotation of the roadway wheels 9 cause the automobile to move up and down or vibrate in a manner similar to actual road conditions; springs 17 and 18 are provided at the front and sides respectively to hold the automobile and consequently the tires 14 at or about the center of the roadway wheel 9.

The roadway wheels 9 are of such a construction and material as will be sufficiently strong to support an automobile and on its periphery are secured the roadway blocks 10, 11, 12, 13, 13$^a$ which can be made of any suitable material such as wood, brick, cement, concrete, fibre, etc., and are made in sections and secured to the periphery of the roadway wheels 9 by bolts as shown in Figs. 4, 5, and 6.

It is obvious that a roadway of any desired surface can be constructed by varying the contour or surface of the blocks; also in view of the fact that the surface is made up of sections, a smooth roadway can be built or a rough one or one partly with a rut.

In turning corners either to the right or left a side thrust is caused on the tires which can be duplicated by using blocks such as 12 for part of the roadway.

When the tire 14 revolves the frictional contact revolves the roadway wheels 9 and consequently one of the shafts 8, partly around which passes belt 29, which also passes partly around pulley 30 secured to shaft 31 in bearing 32; bevel gear 33 is secured to this shaft and meshes with and rotates bevel gear 34 secured to shaft 35 rotating in bearing 36; to shaft 35 is secured crank disk 36$^b$ to which is pivoted connecting rod 37; this rod is also pivoted to lever 38 pivoted on bracket 40 secured to channel 5 (Fig. 3). Pivoted to the other end of lever 38 are connecting rods 41 and 42 which are pivoted to the gas and spark segment of the engine.

It will be noted that the lever 38 and connecting rods 41 and 42 have a series of holes in them through which pass the pins on which they pivot and it is obvious that the movement and position of the gas and spark segment can be varied by using any desired one of the holes.

The rotation of the shaft 8 through belt 29, pulley 30, gears 33 and 34 will rotate crank disk 36$^b$ and this through connecting-rod 37, lever 38 and connecting rods 41 and 42 will cause the gas and spark segment to move to and fro, thus automatically changing the speed of the gas engine; this would be in effect the same as an automobile going up or down a hill.

In this case I would prefer to use as a braking means the pump 28 which is driven by pulley 25, belt 26 and pulley 27.

It is obvious that a change of speed would not be objectionable in using a pump and that a braking effect similar to an automobile moving on a roadway is produced thereby.

If a constant speed is desired then the belt 29 is thrown off or removed and the braking effect is then produced by pulley 21, belt 22, and pulley 23 rotating the armature of the dynamo 24.

By braking effect as herein used is meant some form of resistance to the rotation of the roadway wheels 9; it is obvious that a tire would not receive a correct test if it were only used to rotate the wheel 9, but by introducing some form of resistance to the wheel 9, the strength and wearing qualities of the tire is tested as the effect is the same as the reaction between the tire and the actual roadway. An especially valuable feature of this apparatus lies in the value of useful power that is available while the tires are being tested; about 75% of the power developed by the engine being available for purposes of furnishing light, heat or power for any desired purpose. As an example it can be assumed that a 40 H. P. engine is used in an automobile that is being tested; allowing 10 H. P. for overcoming friction will leave 30 H. P. for any available purpose; assuming a low valuation of 1 cent per hour per H. P., this will amount to $7.20 per 24 hours, and allowing 300 working days per year which will amout to $2160.00 per year. It is thus seen that not only is the expense for attendance low but the value of the available useful power is high For clearness of illustration, in Figs. 1, 2 and 3, I have omitted the bolts for securing the blocks 10, 11, 12, 13 and 13ª to the roadway wheels 9; these I have shown in Figs. 4, 5 and 6.

In Fig. 2 I have shown a pump and dynamo as being driven by the automobile, but it is understood that a countershaft, an air compressor, a fan or any mechanism that will cause the desired braking effect can be used.

The roadway blocks can be made of any desired material, shape or form so as to approximate any given road condition and if in time they become worn, can easily be replaced, and the roadway being sectional can be made smooth or rough in any proportion.

In the illustrations I have shown an automobile with its gas engine but this can be replaced by a motor or the tires can be rotated by a shaft in any manner without departing from the spirit of my invention.

Having thus described my invention, what I claim as new, and desire to secure by Letters Patent, is—

1. A framework adapted to surround an automobile, means for flexibly supporting an automobile therebetween, roadway wheels upon which rest the tires, and means for changing the center distance of the roadway wheels to accommodate automobiles of various lengths of wheel base.

2. A framework adapted to surround an automobile, means for flexibly supporting an automobile therein, roadway wheels upon which rest the tires, and upon the periphery of which is secured sectional or removable blocks, said blocks co-acting by contact with the tires for the purpose of testing the wear and strength of the latter.

3. In a tire testing apparatus, sectional or removable blocks of various contours of surface adapted to be secured to the periphery of a wheel and co-acting by contact with the tires for the purpose of testing the wear and strength of the latter.

4. The combination with a tire testing machine of the character described having spaced rotatable roadway wheels for supporting the tires, of removable sectional blocks having surface contours thereupon approximating a rut in a road secured to the outer peripheral surface of the wheels for the purpose of testing the wear and strength of the tires.

5. The combination with an automobile tire testing mechanism of the character described having automobile supporting roadway wheels, of means for automatically controlling the speed of said wheels, and means controlled by said wheels for intermittently varying the action of the automobile engine.

6. As a means of testing tires, blocks having various contours of surface, and adapted to be secured to a wheel, said surface co-acting with the tire substantially as described and for the purpose specified.

7. In an automobile tire testing mechanism, automobile supporting roadway wheels rotated by the action of the automobile wheels, contractile means at either end of the automobile for holding same normally centrally on the roadway wheels, automatic braking means for the roadway wheels, and speed controlling means cooperatively connecting the roadway wheels with the engine of the automobile substantially as and for the purpose described.

FRANK SCHAFER.

Witnesses:
CARRIE E. RANEY,
FRED SCHAFER.